US008744006B2

(12) United States Patent
Frenne et al.

(10) Patent No.: US 8,744,006 B2
(45) Date of Patent: Jun. 3, 2014

(54) TRANSMIT DIVERSITY FOR PRE-CODED RADIO CONTROL SIGNALS

(75) Inventors: Mattias Frenne, Uppsala (SE); Robert Baldemair, Solna (SE); Jung-Fu Cheng, Fremont, CA (US); Sorour Falahati, Stockholm (SE); Daniel Larsson, Stockholm (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 25 days.

(21) Appl. No.: 13/575,520

(22) PCT Filed: Jan. 26, 2012

(86) PCT No.: PCT/SE2012/050074
§ 371 (c)(1),
(2), (4) Date: Jul. 26, 2012

(87) PCT Pub. No.: WO2013/051979
PCT Pub. Date: Apr. 11, 2013

(65) Prior Publication Data
US 2013/0083867 A1 Apr. 4, 2013

Related U.S. Application Data

(60) Provisional application No. 61/542,581, filed on Oct. 3, 2011.

(51) Int. Cl.
*H04L 27/20* (2006.01)
(52) U.S. Cl.
USPC .......... 375/308; 375/260; 375/267; 375/295; 375/302; 375/316

(58) Field of Classification Search
USPC ......... 375/260, 262, 267, 271, 279, 295, 297, 375/299, 308, 316, 322, 341, 345, 346, 350
See application file for complete search history.

(56) References Cited

U.S. PATENT DOCUMENTS

| 7,649,953 | B2* | 1/2010 | Bauch | 375/267 |
|---|---|---|---|---|
| 7,929,634 | B2* | 4/2011 | Levy | 375/267 |
| 8,498,259 | B2* | 7/2013 | Suzuki et al. | 370/329 |
| 8,520,620 | B2* | 8/2013 | Ji et al. | 370/329 |
| 2010/0041350 | A1* | 2/2010 | Zhang et al. | 455/101 |
| 2012/0057647 | A1* | 3/2012 | Chen et al. | 375/295 |
| 2012/0082075 | A1* | 4/2012 | Luo et al. | 370/310 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 9), 3GPP TS 36.211 V9.1.0 (Mar. 2010), 85 pages.

*Primary Examiner* — Hirdepal Singh
(74) *Attorney, Agent, or Firm* — Blakely Sokoloff Taylor & Zafman, LLP

(57) ABSTRACT

A method sends uplink control information from a user equipment to a serving node of a radio communications system by first encoding uplink control information bits into symbols. The encoded symbols are split into at least two groups of symbols for use to achieve diversity transmission. Each of the at least two groups of symbols are cyclically repeated to generate a repeated group for each of the at least two groups of symbols. Then the repeated groups are mapped each to different transmission ports of the user equipment for diversity transmission as uplink control information through a plurality of uplink transmission slots of an uplink subframe.

25 Claims, 13 Drawing Sheets

(56) References Cited

U.S. PATENT DOCUMENTS

| | | | |
|---|---|---|---|
| 2012/0106478 A1* | 5/2012 | Han et al. | 370/329 |
| 2012/0134306 A1* | 5/2012 | Cheng et al. | 370/281 |
| 2012/0218881 A1* | 8/2012 | Liang et al. | 370/216 |
| 2012/0236809 A1* | 9/2012 | Senoo | 370/329 |
| 2013/0039334 A1* | 2/2013 | Han et al. | 370/330 |
| 2013/0100914 A1* | 4/2013 | Nakamura et al. | 370/329 |

* cited by examiner

US 8,744,006 B2

TRANSMIT DIVERSITY FOR PRE-CODED RADIO CONTROL SIGNALS

CROSS-REFERENCE TO RELATED APPLICATIONS

This application is a National stage of International Application No. PCT/SE2012/050074, filed Jan. 26, 2012, which claims the benefit of U.S. Provisional Application No. 61/542,581, filed Oct. 3, 2011, which are hereby incorporated by reference.

TECHNICAL FIELD

The present disclosure relates to the field of transmit diversity in radio communication systems and, in particular, to transmit diversity by breaking bits into groups.

BACKGROUND

Transmit diversity seeks to vary the transmission path for different aspects of a radio signal. The diversity may be created by sending two signals at different times, on different frequencies, or from different locations. More complex forms of transmit diversity send variations of a single packet more than once so that a receiver may combine the two signals to reconstruct the original packet. In some transmit diversity systems, the two signals both contain all of the information while in other systems, the two signals each contain a different part of the information. Even if all of the bits are not received from one signal or the other, the original packet might be reconstructed using error correction, depuncturing, maximum likelihood sequence estimation or other techniques.

In Long Term Evolution (LTE), transmit diversity for some signals is provided by dividing a packet into parts. The parts are each sent in a different time slot and on a different subcarrier. In addition, different antennas may be used for the two slots. This provides time and frequency diversity and options for spatial diversity.

LTE uses orthogonal frequency division multiplexing (OFDM) in the downlink and discrete Fourier transform (DFT)-spread OFDM in the uplink. The basic LTE downlink physical resource may thus be seen as a time-frequency grid as illustrated in FIG. 1, where each resource element corresponds to one OFDM subcarrier during one OFDM symbol interval. FIG. 1 is a grid diagram of the LTE downlink physical resource (3GPP TS 36.211, Third Generation Partnership Project Technical Specification No. 36.211).

In the time domain, LTE downlink transmissions are organized into radio frames of 10 ms, each radio frame consisting of ten equally-sized subframes of length Tsubframe=1 ms. FIG. 2 is a diagram of the LTE time domain structure where time moves from left to right across the frame.

The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink (DL) transmissions are dynamically scheduled, i.e., in each subframe the base station transmits control information to the remote terminals to indicate the resource blocks assigned to transmit data to each terminal, in the current downlink subframe. The remote terminals are typically referred to in LTE as user equipment or UE. This control signaling is typically transmitted in the first 1, 2, 3 or 4 OFDM symbols in each subframe. A downlink system with 3 OFDM symbols as control is illustrated in FIG. 3. FIG. 3 is a grid diagram of a DL subframe showing control in the first blocks followed by data traffic, with reference symbols dispersed through the grid.

LTE uses hybrid-ARQ (HARQ), where ARQ refers to Automatic Repeat Request or Automatic Repeat Query, where, after receiving downlink data in a subframe, the terminal attempts to decode it and reports to the base station whether the decoding was successful (acknowledgement, ACK) or not (negative acknowledgment, NACK). In case of an unsuccessful decoding attempt, the base station may retransmit the erroneous data.

Uplink control signaling from the terminal to the base station in LTE consists of hybrid-ARQ acknowledgements for received downlink data; terminal reports related to the downlink channel conditions, used as assistance for the downlink scheduling; and scheduling requests, indicating that a mobile terminal needs uplink resources for uplink data transmissions.

If the mobile terminal has not been assigned an uplink resource for data transmission, the L1/L2 (Layer 1/Layer 2) control information (channel-status reports, hybrid-ARQ acknowledgments, and scheduling requests) is transmitted in uplink resources (resource blocks) specifically assigned for uplink L1/L2 control on Release 8 of the Physical Uplink Control Channel (Rel-8 PUCCH).

FIG. 4 is a grid diagram of a PUCCH showing resources assigned for a signal uplink control message. As illustrated in FIG. 4, these resources are located at the edges of the total available cell bandwidth. Each such resource consists of 12 "subcarriers" (one resource block) within each of the two slots of an uplink subframe. In order to provide frequency diversity, these frequency resources frequency hop on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks may be assigned next to the previously assigned resource blocks.

The PUCCH resource blocks are located at the edges of the overall available spectrum to maximize the frequency diversity experienced by the control signaling. Assigning uplink resources for the PUCCH at other positions within the spectrum, i.e. not at the edges, might fragment the uplink spectrum, making it impossible to assign very wide transmission bandwidths to a single mobile terminal and still retain the single-carrier property of the uplink transmission.

When carrier aggregation is used in LTE, one uplink carrier is designed to carry the HARQ-ACK/NACK bits for all DL carrier Physical Downlink Shared Channel (PDSCH) transmissions. To enable the possibility to transmit more than four bits of ACK/NACK, PUCCH format 3 may be used. The basis for Format 3 is DFT-pre-coded OFDM, as diagrammed in FIG. 5 described below.

If the number of ACK/NACK bits is up to 11, then the multiple ACK/NACK bits (which may also include one or more scheduling request (SR) bits) are Reed-Müller (RM) encoded to form 48 coded bits. The coded bits are then scrambled with cell-specific sequences. 24 bits are transmitted within the first slot and the other 24 bits are transmitted within the second slot. The 24 bits per slot are converted into 12 QPSK symbols, spread across five DFTS (DFT Spread)-OFDM symbols using an orthogonal cover code (OCC).

Each of the five sets of QPSK symbols are cyclically shifted with a shift that depends on the cell identity number (Cell ID), the slot number, and the symbol number within the slot. The sets are then DFT pre-coded and transmitted within the one resource block (bandwidth) and five DFTS-OFDM symbols (time) within a slot. The spreading sequence (OCC) is specific to each terminal (UE) and enables multiplexing of up to five users within the same resource blocks.

For the reference signals, cyclic shifted constant amplitude zero autocorrelation (CAZAC) sequences are used. This is shown as a processing diagram in FIG. 5 in which input bits are encoded, scrambled and modulated, then applied to weighting multiplexers and DFTs. The DFTs are applied to inverse fast Fourier transform (IFFT) blocks as shown. This is the DFTS-OFDM based PUCCH format 3 for a UE supporting more than 4 HARQ bits in normal cyclic prefix (CP) subframes.

The bandwidth of one resource block during one subframe is too large for the control signaling needs of a single terminal. Therefore, to efficiently exploit the resources set aside for control signaling, multiple terminals may share the same resource block, by the use of the OCC on the symbols containing data. In this case the reference signals may also be multiplexed among the terminals. This is done by assigning the different terminals different orthogonal phase rotations of a cell-specific length-12 frequency-domain sequence and/or different orthogonal time-domain covers covering the subframes within a slot or subframe.

In LTE Release 10 specifications, orthogonal time-domain covers are not used on the reference signals, but may be used to accommodate additional orthogonal reference signals for PUCCH Format 3. For example, a transmit diversity scheme may be used if one reference signal resource per antenna port is used.

If the number of ACK/NACK bits exceeds 11, then the bits are split into two parts and two RM encoders are used, one for each part respectively. This is known as the dual-RM code. Up to 20 ACK/NACK bits (plus one SR bit) may therefore be supported by PUCCH Format 3. Each encoder in the dual-RM code outputs 24 bits. The bits from the two encoders are combined and converted to 12 quaternary phase-shift keying (QPSK) symbols per slot. These 12 QPSK symbols are then spread across the five DFTS-OFDM symbols per slot using one out of five orthogonal cover codes, as in the single-RM code case.

The encoding and multiplexing for these cases of transmission without transmit diversity are diagrammed in FIGS. 6A and 6B. FIG. 6A shows encoding and multiplexing up to 11 uplink control information (UCI) bits into slot 0 and slot 1. FIG. 6B shows segmenting 12-21 UCI bits into Segment 1 and Segment 2. The segmentation divides the codewords between the two segments, by, for example, alternating odds to the upper path evens to the lower path. These are combined, encoded and mapped to 24 QPSK symbols and then though a splitter to slot 0 and slot 1.

The Dual Codeword Combiner applies an operation in which $\breve{b}_0, \breve{b}_1, \breve{b}_2, \ldots, \breve{b}_{23}$ is the output sequence from the first encoder and $\widetilde{\breve{b}}_0, \widetilde{\breve{b}}_1, \widetilde{\breve{b}}_2, \ldots, \widetilde{\breve{b}}_{23}$ the output sequence from the second encoder and $N_{sc}^{RB}=12$, the number of subcarriers per resource block.

The output bit sequence $b_0, b_1, b_2, \ldots, b_{B-1}$ where $B=4 \cdot N_{sc}^{RB}$ is obtained by the alternate concatenation of the bit sequences $\breve{b}_0, \breve{b}_1, \breve{b}_2, \ldots, \breve{b}_{23}$ and $\widetilde{\breve{b}}_0, \widetilde{\breve{b}}_1, \widetilde{\breve{b}}_2, \ldots, \widetilde{\breve{b}}_{23}$ as follows $$\text{Set } i, j = 0$$
$$\text{while } i < 4 \cdot N_{sc}^{RB}$$
$$b_i = \breve{b}_j, b_{i+1} = \breve{b}_{j+1}$$
$$b_{i+2} = \widetilde{\breve{b}}_j, b_{i+3} = \widetilde{\breve{b}}_{j+1}$$
$$i = i + 4$$
$$j = j + 2$$
$$\text{end while}$$

The "map to . . . " operations apply a cell, slot and symbol specific cyclic shift of the symbols in the time domain to provide inter-cell interference randomization. The DFT processing referred to above is also part of the "map to . . . " operation.

In LTE Release 10, space orthogonal resource transmit diversity (SORTD) is used for PUCCH Format 3 to achieve transmit diversity. Transmission with two antenna ports is supported and the Format 3 encoding and mapping shown in FIG. 5 is repeated for each of the two antennas apart from the cyclic shift of the reference signals and the orthogonal cover codes on the data, which are different to provide orthogonality between signals transmitted on the different antenna ports. The encoding and multiplexing shown in FIGS. 6A and 6B may be adapted to map to two antenna ports and two slots for four paths or to support even more ports and slots.

SUMMARY

It is an object to improve the reception of signals transmitted with diversity in a radio communications system by adapting the way in which symbols are mapped into the diverse transmission modes.

In one example described herein, the user equipment of a radio communications system has a transmission port for each of at last two transmit diversity antennas. Each antenna transmits in uplink slots of an uplink subframe and each slot has a plurality of transmission frequency subcarriers. A method sends uplink control information from the user equipment to a serving node of the radio communications system by first encoding uplink control information bits into symbols. The encoded symbols are split into at least two groups of symbols for use to achieve diversity transmission. Each of the at least two groups of symbols are cyclically repeated to generate a repeated group for each of the at least two groups of symbols. Then the repeated groups are mapped each to different transmission ports of the user equipment for diversity transmission as uplink control information through a plurality of uplink transmission slots of the uplink subframe.

In another example, a computer-readable medium has instructions stored thereon to cause a user equipment of a radio communications system to send uplink control information from the user equipment to a serving node of the radio communications system. The user equipment has a transmission port for each of at last two transmit diversity antennas, each antenna transmitting in uplink slots of an uplink subframe, and each slot having a plurality of transmission frequency subcarriers. The instructions when operated on by the computer cause the computer to perform the following operations. Uplink control information bits are encoded into symbols. The encoded symbols are split into at least two groups of symbols for use to achieve diversity transmission. Each of the at least two groups of symbols are cyclically repeated to generate a repeated group for each of the at least two groups of symbols. Then the repeated groups are mapped each to different transmission ports of the user equipment for diversity transmission as uplink control information through a plurality of uplink transmission slots of the uplink subframe.

In another example, includes a radio terminal of a radio communications system operative to send uplink control information from the radio terminal to a serving node of the radio communications system. The radio terminal has a transmission port for each of at last two transmit diversity antennas. Each antenna transmits in uplink slots of an uplink subframe and each slot has a plurality of transmission frequency subcarriers. The radio terminal has a symbol encoder to encode uplink control information bits 981 into symbols. A symbol splitter splits the encoded symbols into at least two groups of symbols for use to achieve diversity transmission. A repeater cyclically repeats each of the at least two groups of symbols to generate a repeated group for each of the at least two groups of symbols, and a mapper maps the repeated groups each to different transmission ports of the user equipment for diversity transmission as uplink control information through a plurality of uplink transmission slots of the uplink subframe.

BRIEF DESCRIPTION OF THE DRAWINGS

The present disclosure may best be understood by referring to the following description and accompanying drawings.

DETAILED DESCRIPTION

Figure 1:
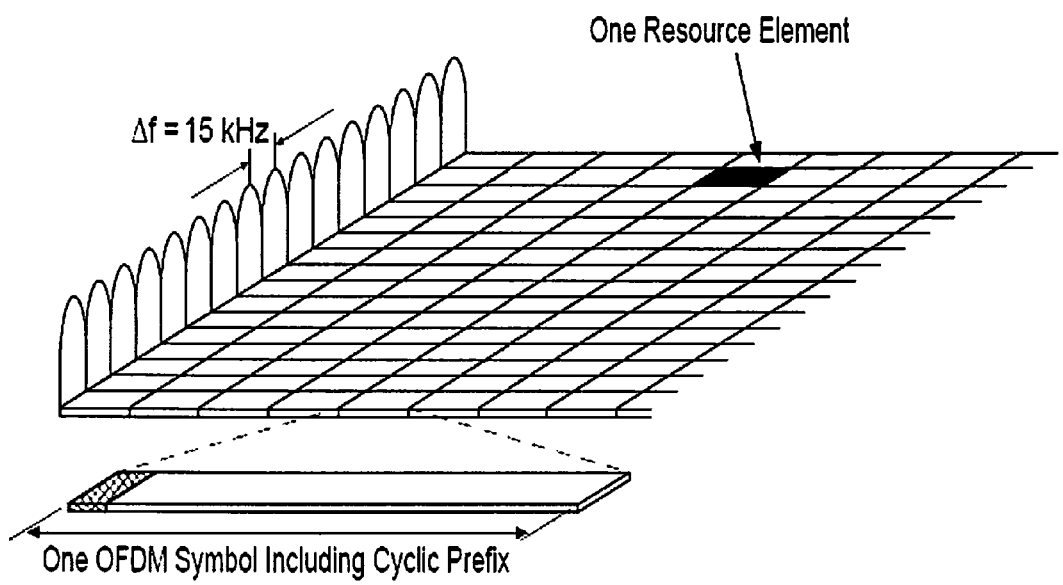
FIG. 1 is a grid diagram of an LTE downlink physical resource.
Figure 2:
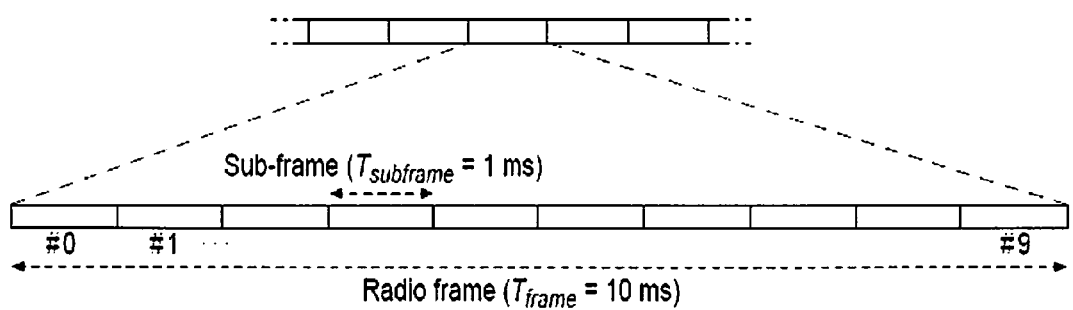
FIG. 2 is a line diagram of an LTE frame and subframe of the time domain structure.
Figure 3:
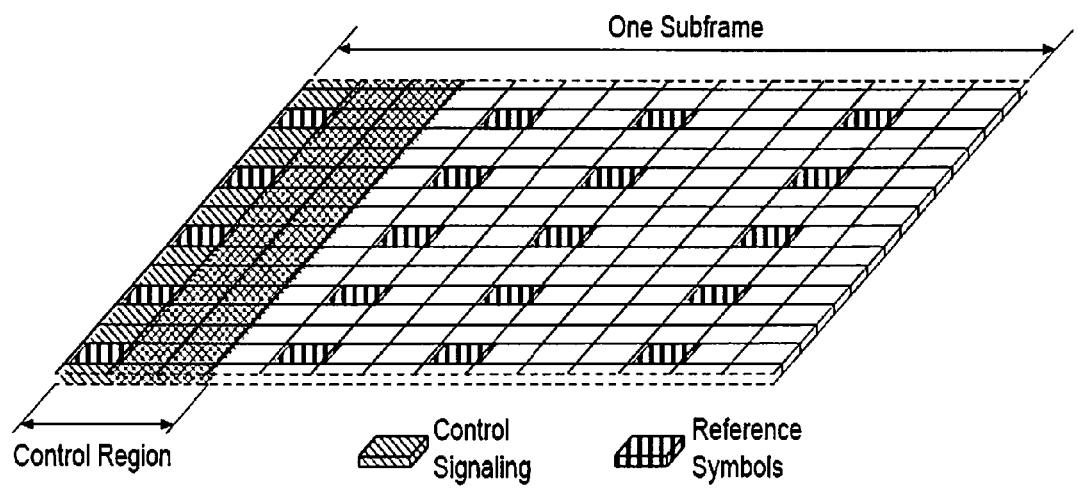
FIG. 3 is a grid diagram of an LTE downlink subframe showing control and data.
Figure 4:
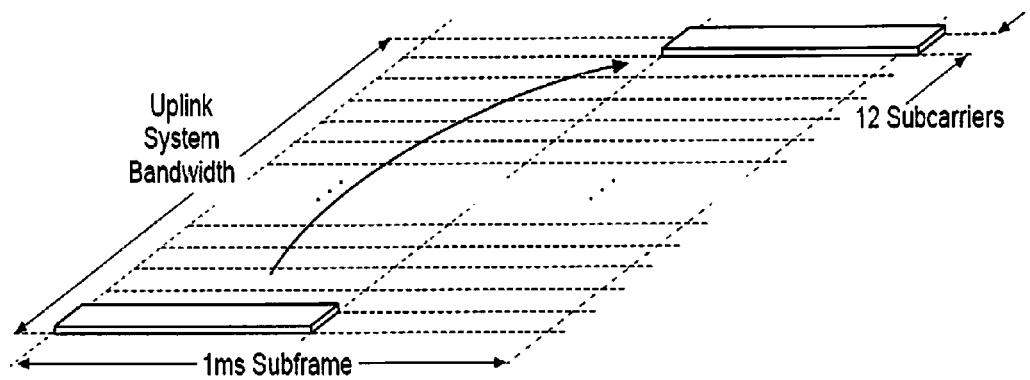
FIG. 4 is a grid diagram of an LTI uplink subframe showing control and data.
Figure 5:
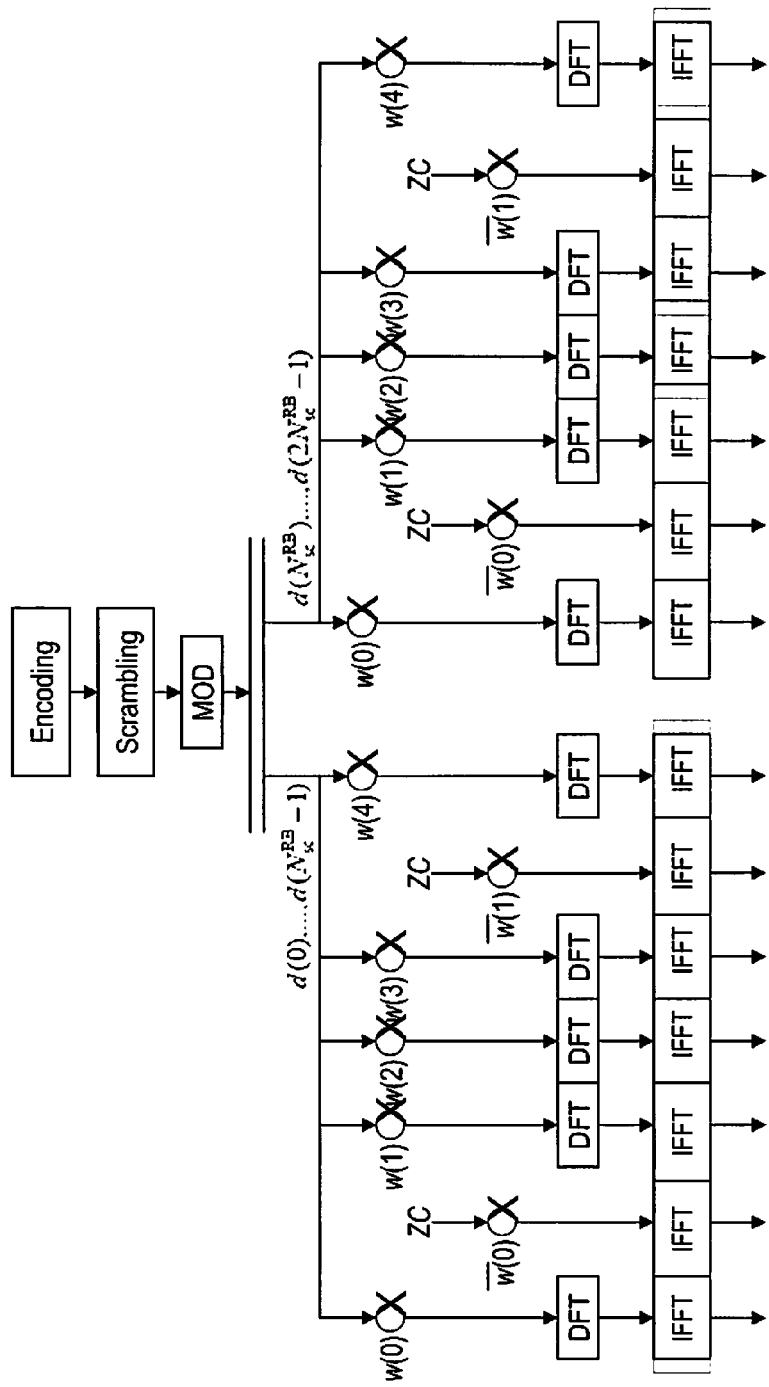
FIG. 5 is a processing diagram of generating discrete Fourier transform pre-coded orthogonal frequency division multiplexed symbols for LTE PUCCH Format 3.

In the following description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers may influence the operation of the lower level functions.

In cellular systems, a network entity in the form of a base station provides a node for communication with mobile devices in one or more cells or sectors. In certain systems, a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNBs) which are configured to provide base station and control functionalities. However, the implementations described herein are not so limited.

In the following description and claims, the terms "UE" and "User Equipment" are used to refer to remote terminals, relays, mobile devices or radios, subscriber equipment and any other type of mobile device that may connect to more than cell and experience a handover. The term "handover" also includes "handoff" The term "eNB" or "cell" is used generally to refer to a base station, an access point, a fixed terminal and similar devices and to the area of radio coverage of a base station, a cell, or a sector. The description is presented in the context of LTE for illustration purposes, but the implementations described herein are not so limited.

Overview

Figure 7:
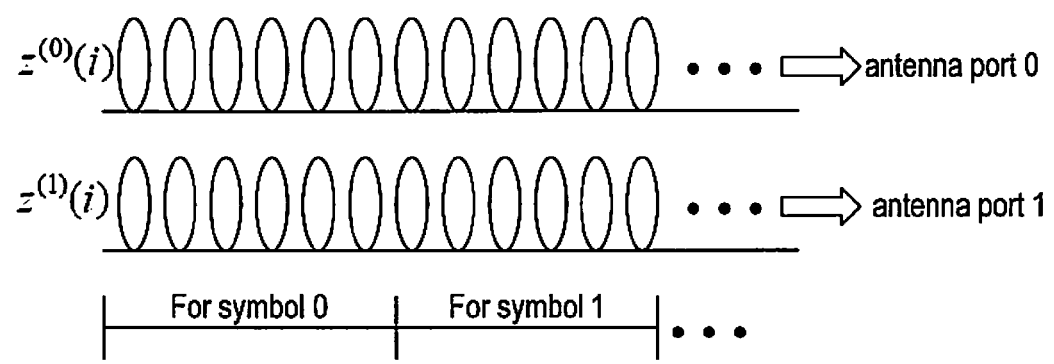
FIG. 7 is a diagram of transmission of a single-carrier FDMA transmission using odd-indexed carriers for on antenna and even-indexed carrier for the other antenna.

In one alternative approach to physical uplink control channel (PUCCH) format 3 transmit diversity, multiple antenna ports are used with a single RM code. This requires only a single orthogonal cover code (OCC) per transmitter even though two transmit ports are used. In this approach, the signals may be made orthogonal through a distributed single carrier-frequency division multiple access (SC-FDMA) modulation technique. FIG. 7 is a diagram of this approach for the case of two antennas, where the DFT-S-OFDM PUCCH signal for antenna port 0 occupies the even-indexed subcarriers and that for antenna port 1 occupies the odd-indexed subcarriers. The even-indexed symbols in the first output block are obtained as the DFT values of the even-indexed input symbols. The odd-indexed symbols in the first output block are set to zero. The odd-indexed symbols in the second output block are obtained as the DFT values of the odd-indexed input symbols. The even-indexed symbols in the second output block are set to zero.

To enhance the coverage of the PUCCH Format 3 channel, diversity may be increased by frequency hopping and/or antenna diversity. Transmit diversity schemes that use a single resource block or single antenna are simple and efficient, but have poor performance and inferior diversity order when combined with the Release 10 encoder and modulator structure.

Specifically, if the SC-FDMA transmit diversity method described above is straightforwardly combined with the dual RM encoding of PUCCH format 3, then no transmit diversity at all is obtained. This is because the first codeword is always mapped to odd subcarriers which are transmitted by the first one of the two available antennas. Similarly, the second codeword is always mapped to the even subcarriers which are transmitted by the second of the two available antennas. As a result, neither codeword can capture spatial diversity benefits since it is only transmitted from one of the two antennas. As a result, the diversity order of a PUCCH Format 3 transmission is greatly reduced for approaches that have the same resource overhead as in the single antenna case.

The disclosed encoder, modulator and transmit diversity techniques ensure that the codeword to subcarrier mapping in both a single and a multiple encoder case is such that codewords are mapped to both available antenna ports and that the output bits of each encoder are re-arranged (interleaved) for further improved performance.

The various different embodiments described below may be applied to PUCCH signals transmitted by two transmit antennas, although the implementations described herein are no so limited. For A/N (ACK.NACK or Acknowledgment/Negative Acknowledgment) or A/N and SR (Scheduling Request) transmission using a dual RM (Reed Müller) encoder, the example of FIG. 8 may be applied for the interleaver used in any of the embodiments above, can be described. While a RM encoder is currently used in LTE, the particular type of error detecting or error correction code is not essential to the implementations described herein and other encoding types may be used depending on the particular implementation.

Figure 8:
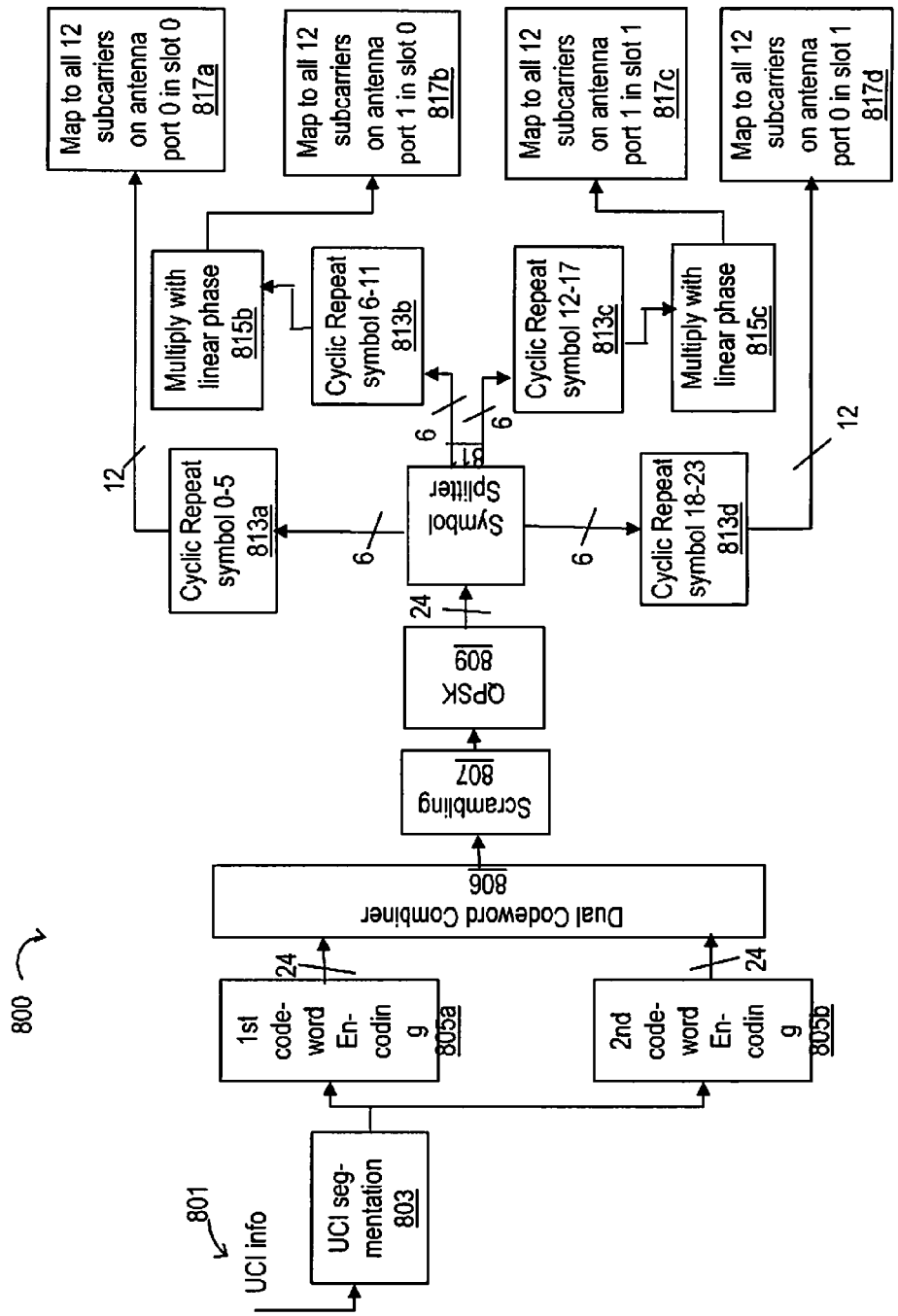
FIG. 8 is a block diagram of a system to encode and map UCI bits onto odd and even numbered subcarriers according to a first embodiment.
Figure 13:
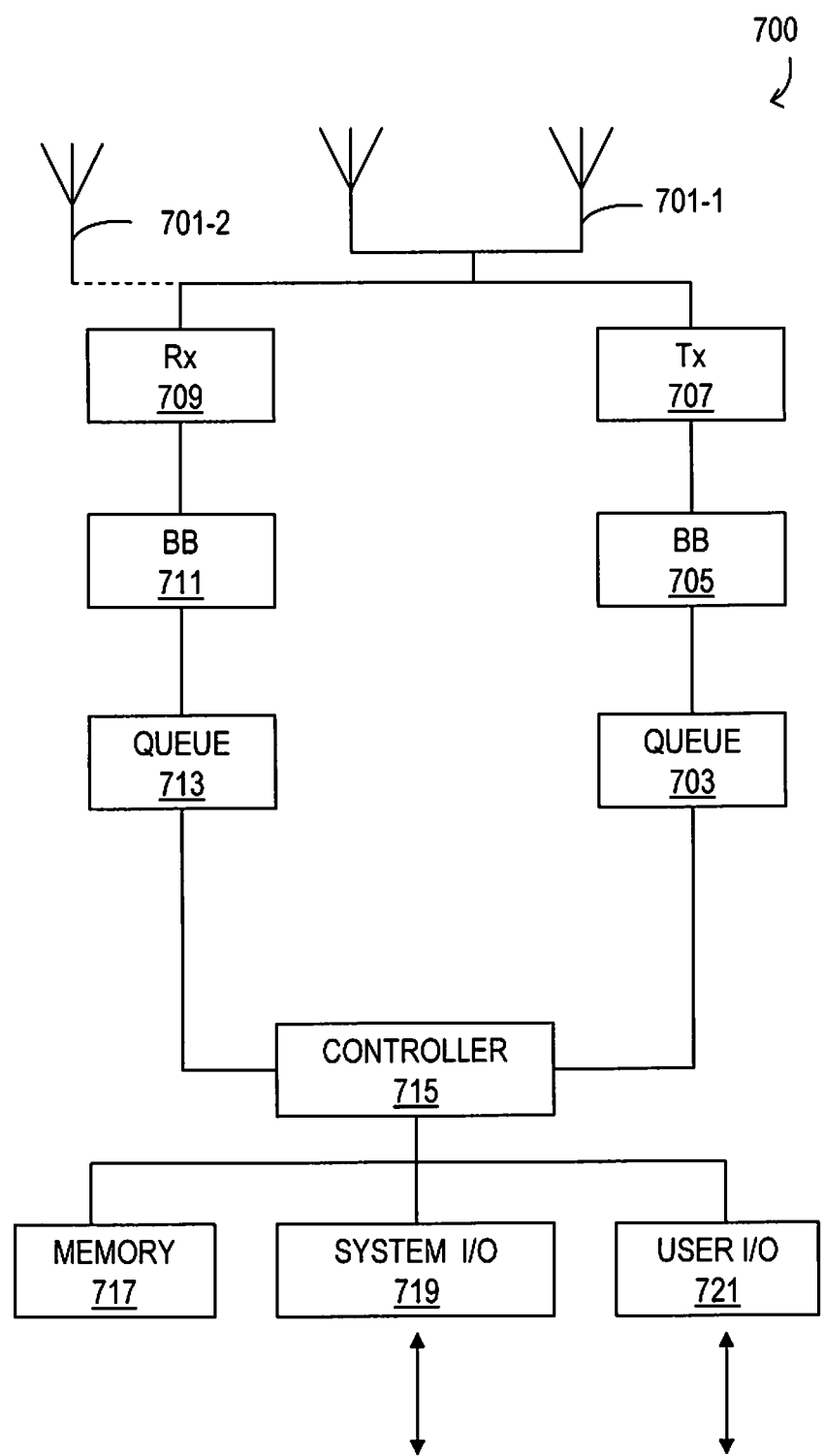
FIG. 13 is a hardware block diagram of a fixed or mobile node for sending or receiving uplink control information according to an embodiment.

FIG. 8 shows an example hardware configuration 800 for implementing techniques described above. The hardware may be implemented in a controller or in a dedicated encoder depending on the particular implementation. At the left, uplink control information (UCI) 801 enters as a stream of bits or as packets to a bit segmentation unit 803. The UCI is generated by the UE in a controller 715 as shown in FIG. 13 or in other equipment as is well-known in the art.

Figure 6A:
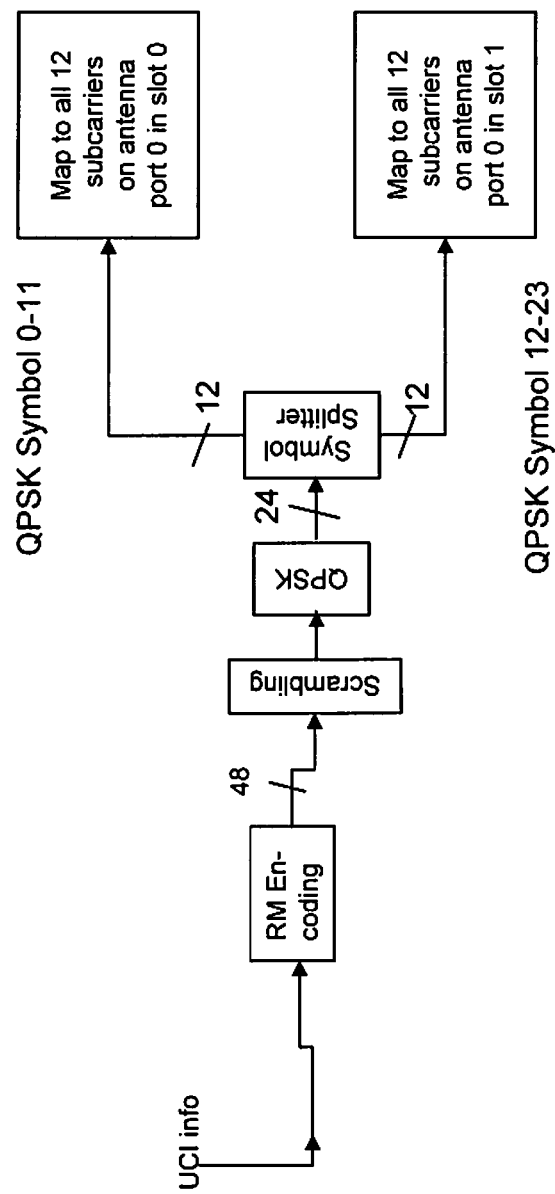
FIG. 6A is a block diagram of an LTE system to multiplex up to 11 uplink control information bits into two different time slots.
Figure 6B:
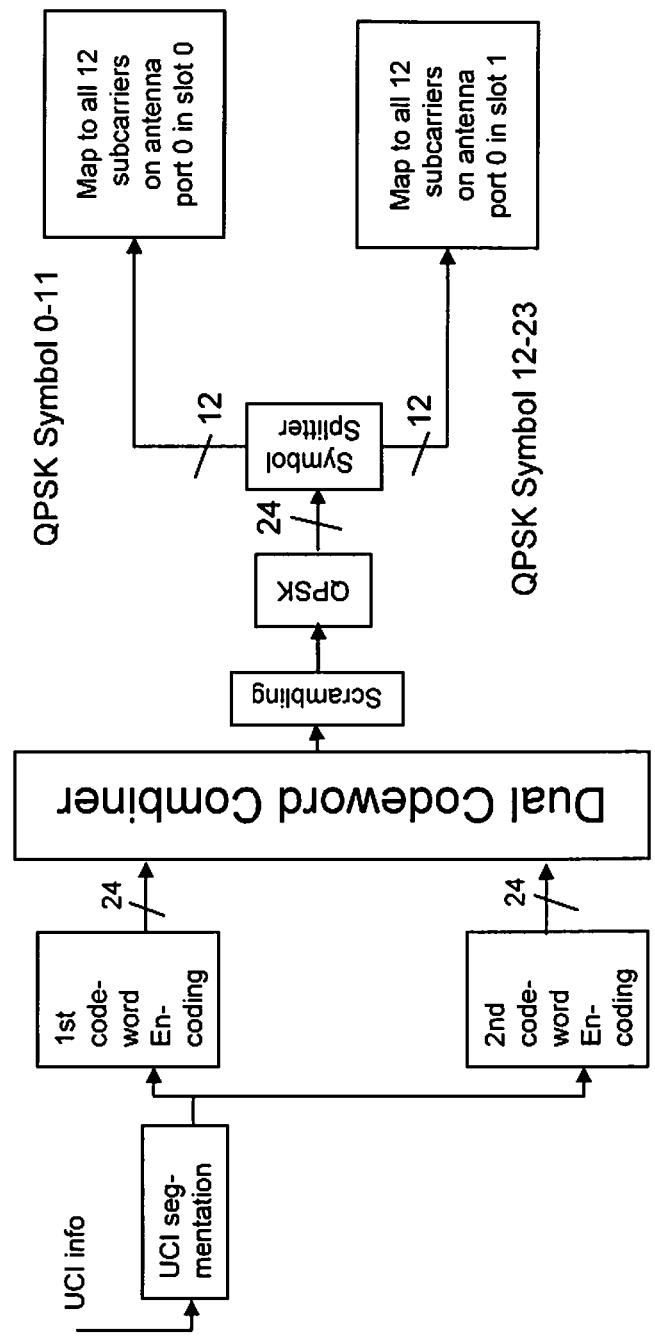
FIG. 6B is a block diagram of an LTE system to multiplex up to 21 uplink control information bits into two different time slots using segmentation.

The bit segmentation unit divides the codewords into two paths, an upper path, and a lower path. Each path is applied to a respective RM encoder 805a, 805b. A dual codeword combiner 806, as described above with respect to FIG. 6B is introduced after each RM encoder. The combined output is scrambled in a scrambler 807 and then QPSK encoded 809 so that the two combined codewords are encoded as 24 symbols. The QPSK encoder 809 functions to map encoded bits to QPSK symbols. While QPSK encoding is shown and is presently preferred for LTE, other types of encoding may be used to adapt the technique to other systems.

For each slot, a set of 12 QPSK modulation symbols are generated and the 12 first and second segmentation unit 803 output bits are mapped to the real and imaginary axis respectively. Then further processing follows the SC-FDMA approach described above. For instance; an extended transform coding block takes in a block of 12 complex-valued symbols and outputs two blocks of 12 complex-valued DFT-domain symbols.

As stated above, the output stream of bits from the dual codeword combiner 806 is scrambled by scrambler 807 and modulated by modulator 809. In the illustrated example, 48 bits are QPSK modulated to obtain 24 symbols d(i). These symbols are then split into 4 parts or groups of equal size of 6 symbols each by a symbol splitter 811. Each group of 6 symbols is then cyclically repeated once in a respective repeater 813a, 813b, 813c, 813d and two of the resulting repeated groups of 12 symbols are subjected to a linear phase shift in a multiplexer 815b, 815c. The linear phase shift after DFT precoding provides a frequency shift of one subcarrier in the frequency domain for the two shifted groups.

This can mathematically be described as $$d^{(p)}(i) = \begin{cases} d(i \bmod N_{sc}^{RB}/P + \tilde{p} \cdot N_{sc}^{RB}/P) \cdot e^{j\frac{2\pi \tilde{p} i}{N_{sc}^{RB}}} & i < N_{sc}^{RB} \\ d(i \bmod N_{sc}^{RB}/P + \tilde{p} \cdot N_{sc}^{RB}/P + N_{sc}^{RB}) \cdot e^{j\frac{2\pi \tilde{p} i}{N_{sc}^{RB}}} & \text{otherwise} \end{cases}$$

$$i = 0, 1, \ldots, 2N_{sc}^{RB} - 1$$

Where $d(i)$, $i=0, 1, \ldots 2N_{sc}^{RB}-1$ is used to describe the 24 modulated symbols, $N_{sc}^{RB}$ is the number of subcarriers (e.g. 12) in one resource block, $P=2$ is the number of antenna ports, here $P=2$ but this principle may be extended to more than two antenna ports. Furthermore $\tilde{p}=0,1$ are the indices of the antenna ports.

Note that the operations described mathematically here ensure that the 6 first symbols are mapped to the even subcarriers of the first slot of the zeroth antenna port in a first mapper 817a, the next 6 symbols to the odd subcarriers of the first slot of the first antenna port in a second mapper 817b, the following 6 symbols to the even subcarriers of the second slot of the zeroth antenna port in a third mapper 817c, and the last 6 symbols to the odd subcarriers of the second slot of the first antenna port in a fourth mapper 817d.

This embodiment ensures that each codeword is mapped to both antenna ports and both slots to provide both antenna and frequency diversity gain.

Note also the above operations described mathematically here may be applied to more transmit antennas. The transmit diversity coding may hence be adapted for P=2, 3, 4, 6, 12 or any other number of transmit antennas by applying the same principles and formulas.

Figure 9:
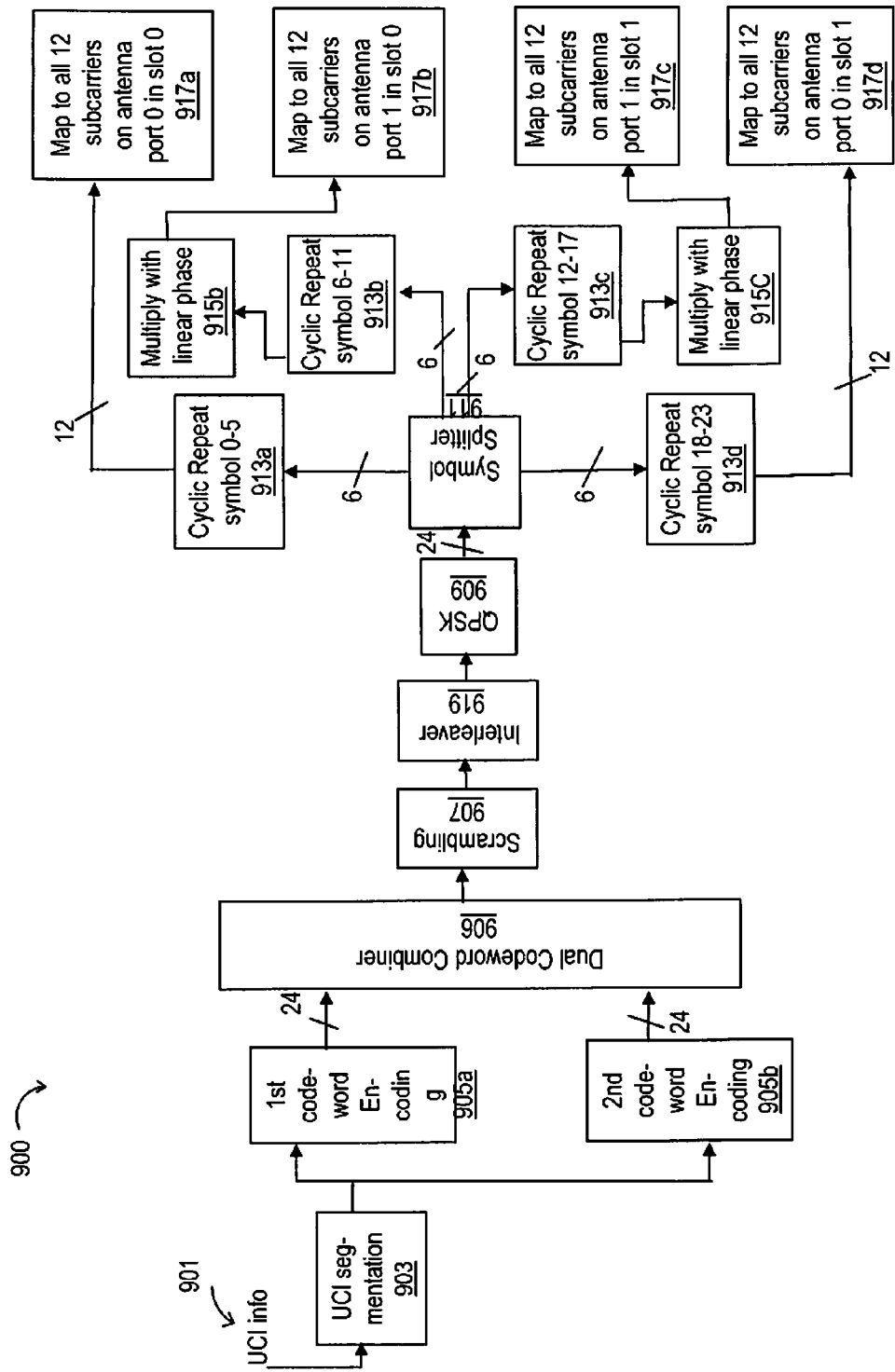
FIG. 9 is a block diagram of a system to encode and map UCI bits onto odd and even numbered subcarriers according to a second embodiment.

FIG. 9 shows a variation 900 of the embodiment of FIG. 8 in which a bit interleaver 919 is added after a dual codeword combiner 906 and scrambler 907 and before a modulator or encoder 909. The interleaver 919 maximizes the obtained antenna and frequency diversity order for the two codewords from the UCI segmentation 903.

In the example of FIG. 9, UCI information 901 is received at a bit segmentation unit 903 that generates two segments. The first segment takes an upper path to a first codeword encoder 905a and the second segment takes a lower path to a second codeword encoder 905b. The encoded codewords are provided to a dual codeword combiner 906, that sends the combined codewords to a scrambler 907. These operations may all be performed in the same or similar way as in FIG. 8 using the same or similar hardware. The scrambled combined codewords are then fed to the interleaver 919.

The interleaver 919 may be designed to enhance transmit diversity. If the interleaver is introduced after the scrambling operation 907, then the block of scrambled bits $\tilde{b}(0), \ldots, \tilde{b}(47)$ may be interleaved according to the following interleaver:

[0, 1, 2, 3, 5, 9, 7, 11, 25, 32, 27, 34
4, 8, 6, 10, 12, 17, 14, 19, 20, 36, 22, 38,
13, 16, 15, 18, 21, 28, 23, 30, 40, 41, 42, 43,
24, 29, 26, 31, 33, 37, 35, 39, 44, 45, 46, 47], resulting in a block of interleaved scrambled bits $\tilde{\tilde{b}}(0), \ldots, \tilde{\tilde{b}}(M_{bit}-1)$.

Modifications and rearrangements of this interleaver sequence are possible without changing the properties of achieving maximized antenna and frequency diversity. More specifically, the length-48 interleaver may be divided into four length-12 segments. The order of the four segments may also be rearranged. For instance, the following interleaver will achieve the same performance as the interleaver described above:

[0, 1, 2, 3, 5, 9, 7, 11, 25, 32, 27, 34,
13, 16, 15, 18, 21, 28, 23, 30, 40, 41, 42, 43,
4, 8, 6, 10, 12, 17, 14, 19, 20, 36, 22, 38,
24, 29, 26, 31, 33, 37, 35, 39, 44, 45, 46, 47].

Furthermore, the order of bits within each of such segments may be arbitrarily rearranged. For instance, the following interleaver shows an example of such a modification:

[0, 1, 2, 3, 5, 9, 7, 11, 25, 27, 32, 34,
4, 8, 6, 10, 12, 14, 17, 19, 20, 22, 36, 38,
13, 15, 16, 18, 21, 23, 28, 30, 40, 41, 42, 43,
24, 26, 29, 31, 33, 35, 37, 39, 44, 45, 46, 47].

After this interleaving, the interleaved codewords are applied a QPSK encoder 909 to generate symbols as described above for FIG. 8. Similarly, these symbols are split into four groups in a splitter 911 that are then applied to cyclic repeaters 913a, 913b, 913c, 913d and the repeated symbol sequences are mapped in mappers 917a, 917b, 917c, 917d as in FIG. 8. Two of the four groups are phase reversed by multiplexers 915b, 915c, so that there is a frequency shift after the DFT pre-coding also as in FIG. 8.

Figure 10:
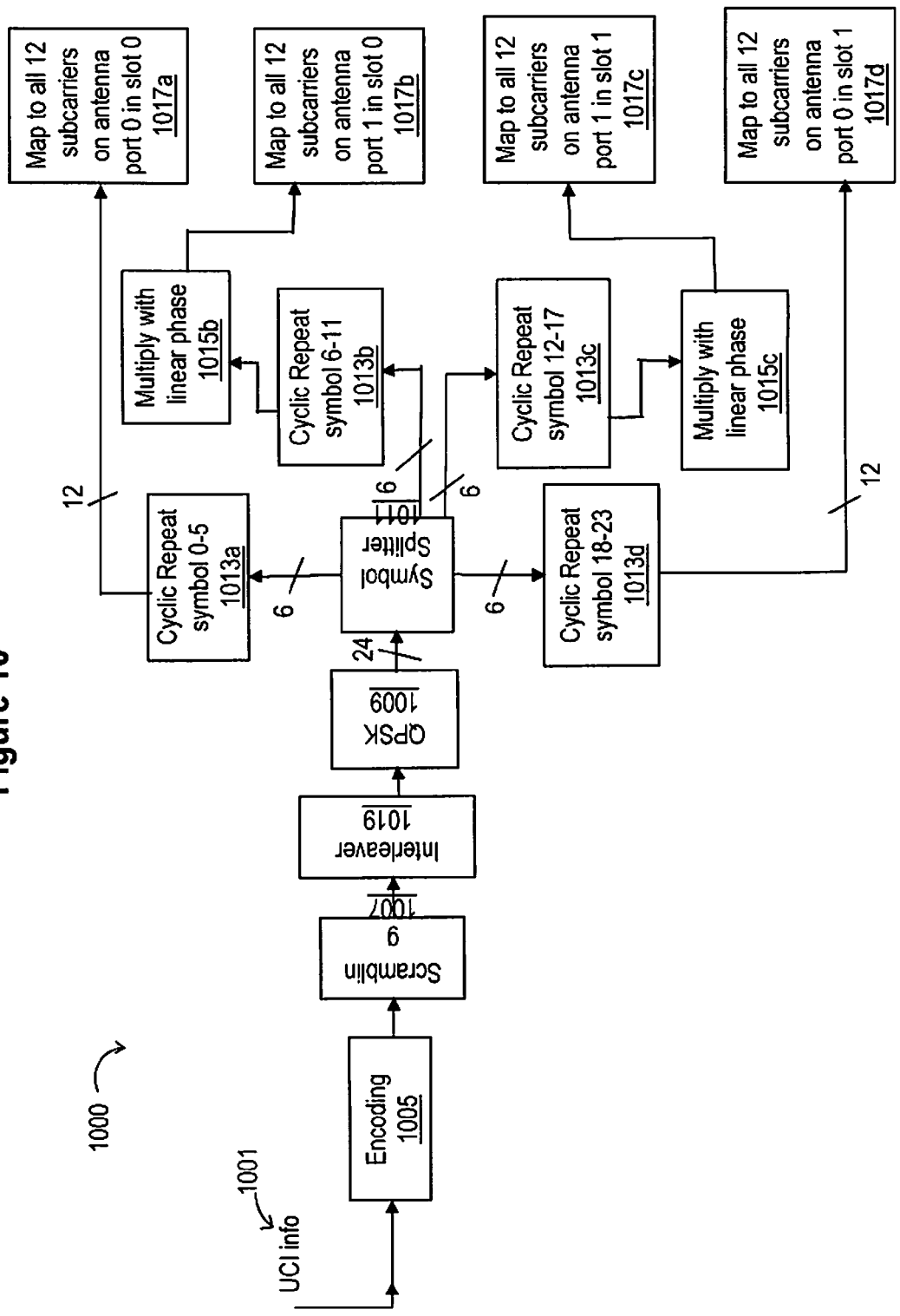
FIG. 10 is a block diagram of a system to encode and map UCI bits onto odd and even numbered subcarriers according to a third embodiment.

FIG. 10 shows a modification 1000 of the systems of FIGS. 8 and 9 in which a single codeword RM encoder 1005 is used and an interleaver 1019 is used to maximize the antenna and frequency diversity. A variety of different interleavers may be used depending on the particular implementation including the interleavers described above in the context of FIG. 9. The other components of FIG. 10 may be the same or similar to those of FIGS. 8 and 9.

As shown in FIG. 10, UCI information 1001 is applied directly to an encoder 1005, such as a Reed-Muller encoder and the output encoded bit sequence is scrambled in a scrambler 1007 and then interleaved 1019 in the manner for example described above in the context of FIG. 9. The interleaved bits are encoded as QPSK symbols in an encoder 1009 to produce a 24 symbol sequence.

As in FIGS. 8 and 9, the symbols are then applied to a splitter 1011 to obtain four groups of 6 symbols each which are then repeated in cyclic repeaters 1013a, 1013b, 1013c, 1013d, with two of the groups being multiplexed 1015b, 1015c. The groups of symbols are then each mapped in respective mappers 1017a, 1017b, 1017c, 1017d. This transmit diversity system 1000 allows the transmit diversity benefits described above to be applied to a single stream of UCI info without the parallel paths and without the combiner 906, used in the previously described embodiments.

Figure 11:
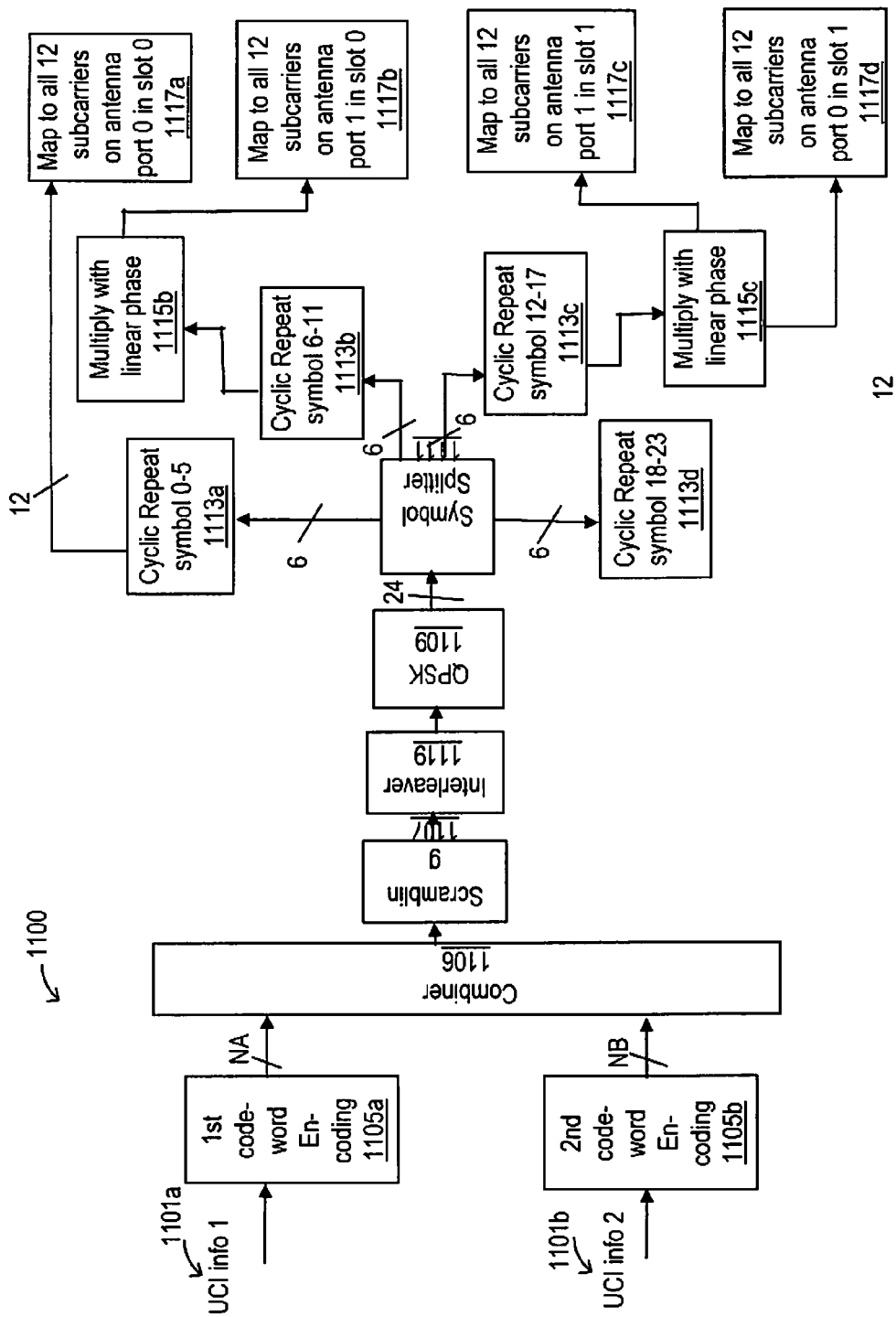
FIG. 11 is a block diagram of a system to encode and map UCI bits onto odd and even numbered subcarriers according to a fourth embodiment.

FIG. 11 shows another example implementation. In this embodiment, two types of UCI information 1101a, 1101b are generated. The first sequence 1101a has NA codewords and the second sequence 1101b has NB codewords. Each sequence is encoded in respective RM encoders 1105a, 1105b and the encoded bits are provided to a single combiner 1106. In the embodiments of FIGS. 8, 9, and 10, the NA and NB codewords are generated as single stream. In this case the two streams are separately provided and encoded and then combined.

A dual codeword combiner such as that of FIGS. 8 and 9 may be used to combine the bits. The dual codeword combiner 1106 of FIG. 11 depends on the values of NA and NB. A bit interleaver 1119 may be used after a scrambler 1107 and the combiner 1106 to improve the antenna and frequency diversity of the transmission. The two types of UCI information may be HARQ-ACK (with or without scheduling request bits) and channel state information (CSI) respectively. Alternatively, other types of codewords may be used in addition to or instead of HARQ-ACK and CSI.

The interleaved bits are encoded as QPSK symbols in an encoder 1109 to produce a 24 symbol sequence. As in FIGS. 8, 9, and 10, the symbols are then applied to a splitter 1111 to obtain four groups of 6 symbols each which are then repeated in cyclic repeaters 1113a, 1113b, 1113c, 1113d, with two of the groups being multiplexed 1115b, 1115c. The groups of symbols are then each mapped in respective mappers 1117a, 1117b, 1117c, 1117d. This transmit diversity system 1100 allows the transmit diversity benefits described above to be applied to two different streams of UCI info processed as two parallel paths.

The implementations described above present numerous advantages. First, they may be used to ensure maximal antenna and frequency diversity gain for all payloads while having about the same usage as for the single antenna case. This diversity is provided with minimal resource overhead and resource allocation is simplified and unified with a single antenna case. The transmit diversity scheme described above is not limited to two antennas but may easily be scaled to up to P=12 transmit antenna ports and beyond.

In addition, in the case of an LTE application, the described embodiments are largely compatible with existing standards. The Rel.10 interference randomization by cyclic shift operation of the symbols before the DFT precoder may be maintained unchanged. Separate processing for each antenna port as described above allows for parallel processing in the transmitter so that existing LTE hardware may also be used.

It can be determined that for an LTE transmission with a single antenna, frequency-hopping diversity is lost whenever at least one of the minimum slot Hamming distances are zero. The Rel-10 LTE Format 3 PUCCH achieves full frequency hopping diversity for payload sizes up to 20 bits. However, for payload size of 21 bits, the full frequency diversity is not achieved because the RM codeword carrying 11 bits fails to provide a nonzero Hamming distances in both hops. The interleaver described above avoids this shortcoming for payload sizes of 21 bits and may be used to restore full frequency diversity.

With the transmit diversity methods described above, each codeword in PUCCH Format 3 is effectively broken into four segments, each of which is transmitted over a different channel (two frequency segments and two antenna segments) through the splitter, cyclic repeaters, and mappers.

The interleaving or bit rearranging techniques described above in the combiner, scrambler, and interleaver redistribute the bits in order to capture greatly improved diversity orders. However, it is difficult to define the best interleaver for this purpose. A straightforward search through all possible interleavers will prove infeasible since there are $24!=6.2045\times10^{23}$ interleaver candidates. Appropriate interleavers may be defined more easily as described below.

A primary performance bound is how the total minimum Hamming distance is distributed between the two slots for the single-antenna case or among the four segments for the dual-antenna case. Given the same set of coded bits in the same slot/segment, the ordering of these bits cannot affect the slot/segment Hamming distance. Hence, rearranging a group of code bits within the same slot/segment has no effect on the link performance. The interleaver search problem may therefore be treated as a bipartite or quad-partite assignment problem, which concerns assigning the 24 coded bits into two or four subsets of equal size (for the single and dual antenna case respectively). A similar approach may be modified for application to systems with more than two antennas and/or more than two frequency segments. For system with more antennas or frequency segments, the problem may be treated as an M-partite assignment problem where M is the product of the number of frequency segments and the number of antennas.

Furthermore, to simplify implementation, it is preferred to find an interleaver with optimized performance for both single and dual antenna cases. Therefore, a first bipartite search through $$\frac{1}{2}\binom{24}{12} = 1,352,078$$

candidates delivers an optimized interleaver for the single antenna case. The interleaver ensures full frequency diversity for PUCCH Format 3 signals with payload sizes up to 21 bits.

A second bipartite search of $$\left[\frac{1}{2}\binom{12}{6}\right]^2 = 213,444$$

possible re-bi-partitioning of the two slots of the first optimized interleaver delivers the optimized interleaver for the dual antenna case. This interleaver captures the maximum achievable diversity order of 4L for payload sizes up to 12 bits and diversity order of 3L for payload sizes from 13 to 21 bits.

Further Considerations

In the present description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

In the present description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, a so-called protocol stack, wherein the higher level layers may influence the operation of the lower level functions.

In cellular systems, a network entity in the form of a base station provides a node for communication with mobile devices in one or more cells or sectors. In certain systems, a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNBs) which are configured to provide base station and control functionalities. However, the implementations described herein are not so limited.

In the present description and claims, the terms "UE" and "User Equipment" are used to refer to remote terminals, mobile devices or radios, subscriber equipment and any other type of mobile device that may connect to more than cell and experience a handover. The term "handover" also includes "handoff." The term "eNB" or "cell" is used generally to refer to a base station, an access point, a fixed terminal and similar devices and to the area of radio coverage of a base station, a cell, or a sector. The description is presented in the context of LTE for illustration purposes, but the implementations described herein are not so limited. 3GPP TS 36.212, "Multiplexing and channel coding."

Figure 12:
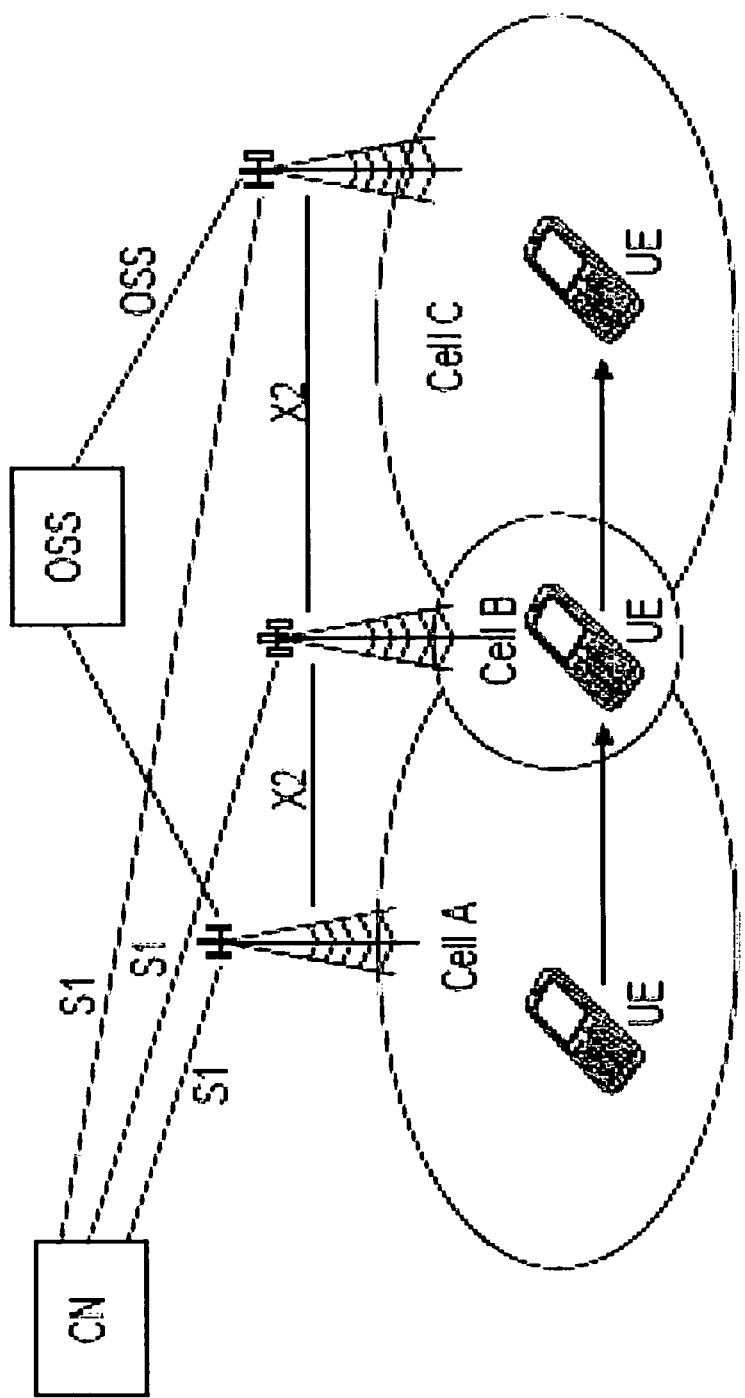
FIG. 12 is a system diagram of a user equipment in a radio communications system traversing from cell A to cell B.

FIG. 12 is a diagram of the general configuration of the radio communications system. In FIG. 12, a UE is moving from Cell A to Cell B and then to Cell C as indicated by the arrows pointing to the right in the figure. Each cell has a base station illustrated as a tower, such as an eNB, or similar structure near the center of each of the three cells. While the base stations are shown as being near the center of each cell, they may alternatively define the sides of each cell using sectorized antennas or be in any other desired configuration. In E-UTRAN, different user equipment terminals (UE) are wirelessly connected to radio base stations (usually referred to as evolved NodeB (eNB)) and send uplink control channel signals to one or more of the base stations. In E-UTRAN the radio base stations send downlink control channel signals to the UEs and are directly connected to a core network (CN) via an S1 interface which controls the eNBs connected to it. The eNBs are also connected to each other via an X2 interface. An Operation and Support System (OSS) is logically connected to all the radio base stations as well as to the CN, via an OSS interface.

FIG. 13 is an example hardware diagram of a device architecture suitable for the UE and for an eNB. The hardware 700 includes one or more antenna elements 701. There may be separate transmit and receive arrays, sectorized or diversity antennas or a single omnidirectional antenna element. For transmission, data is collected in a transmit queue 703 from which it is transferred to a baseband modulator 705 for conversion to symbols, modulation and upconversion. A transmitter 707 further modulates and amplifies the signal for transmission through the antenna.

On the receive side, received symbols are demodulated and downconverted to baseband in a receive chain 709. The baseband system extracts a bit sequence from the received signal and generates any error detection codes that may be needed. The bit stream is stored in a receive buffer or queue 713 for use by the system.

A controller 715 controls the operation of the receive and transmit chains, applies data to the outbound queue and receives data from the inbound queue. It also generates messages to support the wireless and wired protocols over which it communicates. The controller is coupled to one or more memory systems 717 which may contain software, intermediate cached values, configuration parameters, user and system data. The controller may also include internal memory in which any one or more of these types of information and data may be stored instead of or in addition to being stored in the external memory system. The controller is coupled to a system input/output interface 719 which allows for communication with external devices and a user input/output interface 721 to allow for user control, consumption, administration and operation of the system.

In the case of an eNB, the system interface 719 may provide access over the S1, OSS and X2 interfaces to the rest of the network equipment to send and receive data, messages, and administrative data. However, one or more of these interfaces may also use the radio interface 701 or another interface (not shown). In the case of a UE, the system interface may connect to other components on the device, such as sensors, microphones, and cameras, as well as to other devices, such as personal computers or other types of wireless networks, through wireless or wired interfaces.

Figure 14:
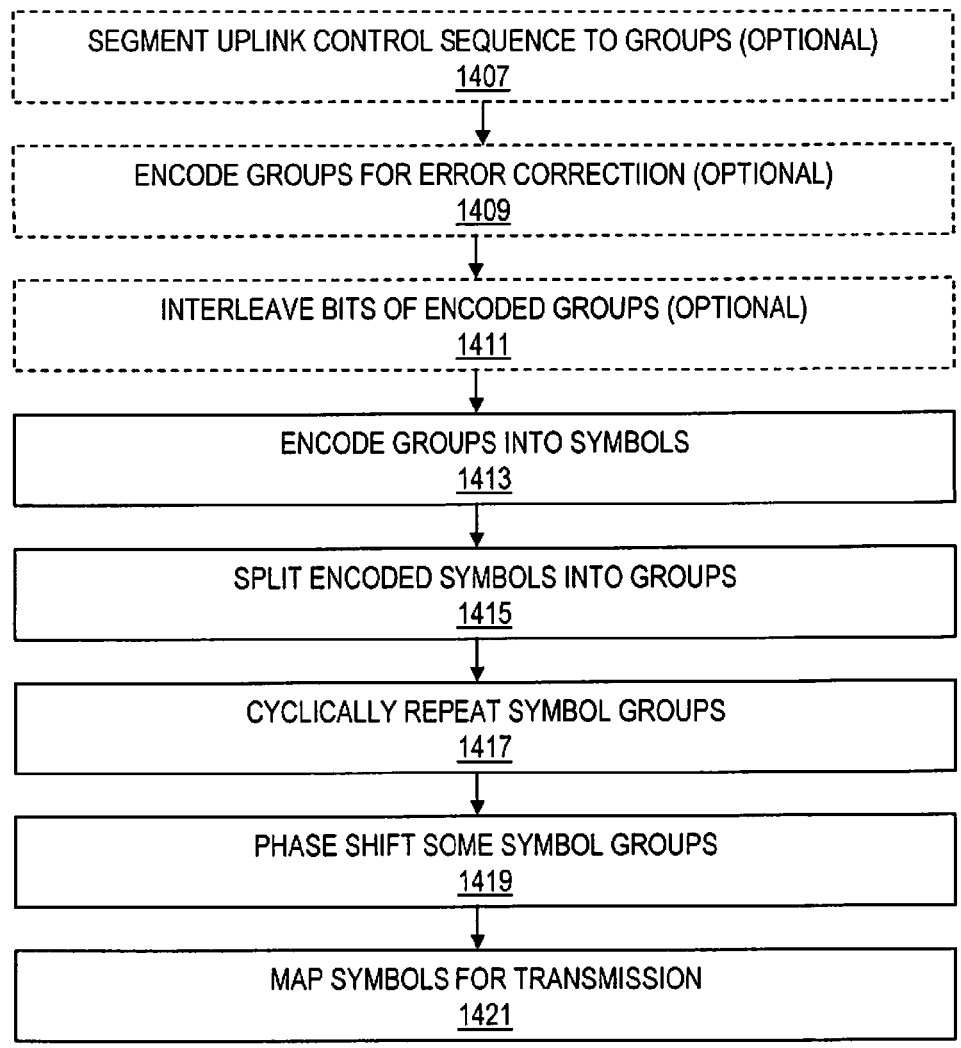
FIG. 14 is a process flow diagram of encoding and mapping UCI bits according to an embodiment.

FIG. 14 is a process flow diagram showing the processes described above. This process in particular may be implemented in a user equipment of a radio communications system to send uplink control information from the user equipment to a serving node of the radio communications system.

At 1407, a sequence of bits of uplink control information (UCI) is segmented to form a plurality of groups of UCI bits. At 1409, the groups of UCI bits are each encoded in respective error correcting encoders, one for each group of UCI bits. At 1411, the groups of UCI bits are applied to an interleaver. The interleaver reorders the sequence of the combined groups of UCI bits to improve the transmission characteristics. As mentioned above, the robustness of the transmission may be improved by reducing the Hamming distance between the groups of transmitted symbols as they are eventually transmitted. The interleaver may also be used to reduce the Hamming distance between groups of symbols that will be mapped to different transmission ports.

In several of the examples described above, the UCI bits are separated into groups. These groups may be combined again (not shown) before the interleaving so that there is only a single stream of UCI bits to be applied to the interleaver. The combining operation may be alternate concatenation or any other combination operation.

As shown in FIG. 14, the operations at 1407, 1409 and 1411 are optional. The UCI bits may be applied directly to 1413 and be encoded into symbols. At 1413, the uplink control information bits are encoded into symbols. These bits may be direct from higher layers as uplink control bits or they may be subjected to one or more of segmenting, error correction encoding, combining, or interleaving.

The user equipment has a transmission port for each of at last two transmit diversity antennas and each antenna transmits in uplink slots of an uplink subframe. The uplink slots have multiple transmission frequency subcarriers.

In order to use the transmit diversity equipment of the UE, the encoded symbols are split at 1415 into at least two groups of symbols for use to achieve diversity transmission. Some or all of the groups are then cyclically repeated at 1417 to generate a repeated group for each of the at least two groups of symbols. The repeated groups are then mapped at 1421 for transmission. Each repeated group is mapped to a different transmission port of the user equipment for diversity transmission as uplink control information through a plurality of uplink transmission slots of the uplink subframe.

In one example, the encoded symbols are split into four groups of symbols for use to achieve diversity transmission. Two of the four groups of symbols are phase shifted in the time domain to provide a frequency shift of one subcarrier in the frequency domain. The phase shifted groups of symbols are then mapped to one of the odd and even subcarriers, while the groups of symbols that are not phase shifted are mapped to the other of the odd and even subcarriers.

At 1415 the groups of UCI bits are encoded into symbols. This may be done in a variety of different ways. In one example, bits from a first group of UCI bits are applied to one axis of a phase-shift keyed encoder such as quaternary phase-shift keyed (QPSK), while bits from a second group of UCI bits are applied to another axis of the phase-shift keyed encoder. The repeated groups of symbols can then be mapped by applying the symbols from each group to a different port for transmission.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touch screen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of variations described above may be implemented using different combinations of software, firmware, and/or hardware.

While the this disclosure is presented in the context of UCI bits, the described segmentation or grouping techniques may also be applied to other kinds of data. The implementations described herein are not limited to bits having any particular meaning nor to any types of signals. The described techniques may be applied to downlink data and control as well as to uplink data and control.

While the implementations described herein have been described in terms of several embodiments, those skilled in the art will recognize that the implementations are not limited to the embodiments described, may be practiced with modification and alteration. The description is thus to be regarded as illustrative instead of limiting.

The invention claimed is:

1. A method implemented in a user equipment of a radio communications system to send uplink control information from the user equipment to a serving node of the radio communications system, the user equipment having a transmission port for each of at least two transmit diversity antennas, each antenna transmitting in uplink slots of an uplink subframe, each slot having a plurality of transmission frequency subcarriers, the method comprising:
encoding uplink control information bits into symbols;
splitting the encoded symbols into at least four groups of symbols for use to achieve diversity transmission;
phase shifting two of the at least four groups of symbols to provide a frequency shift of one subcarrier;
cyclically repeating each of the at least four groups of symbols to generate a repeated group for each of the at least four groups of symbols; and
mapping the repeated groups each to different transmission ports of the user equipment for diversity transmission as uplink control information through a plurality of uplink transmission slots of the uplink subframe.

2. The method of claim 1, wherein mapping comprises mapping the phase shifted groups of symbols to one of the odd and even subcarriers and mapping the groups of symbols that are not phase shifted to the other of the odd and even subcarriers.

3. The method of claim 1, further comprising:
segmenting a sequence of bits of uplink control information (UCI) to form a plurality of groups of UCI bits,
encoding the groups of UCI bits in respective error correcting encoders, one for each group of UCI bits; and
providing the encoded groups of UCI bits as UCI bits for encoding into symbols.

4. The method of claim 3, wherein encoding the groups of UCI bits into symbols comprises applying bits from a first group of UCI bits to one axis of a phase-shift keyed encoder and applying bits from a second group of UCI bits to another axis of a phase-shift keyed encoder and wherein mapping the repeated groups comprises applying symbols of the phase-shift keyed encoder to different ports for transmission.

5. The method of claim 4, wherein segmenting comprises segmenting the sequence of UCI bits into two groups of UCI bits, wherein the phase-shift keyed encoder is a quaternary phase-shift keyed (QPSK) encoder, wherein encoding the groups of UCI bits into symbols comprises applying bits of both groups to each of two QPSK encoders, and wherein mapping the symbols comprises applying the output of each QPSK encoder to one of two different ports.

6. The method of claim 3, further comprising combining the groups of UCI bits before encoding into symbols.

7. The method of claim 6, wherein combining comprises combining by alternate concatenation.

8. The method of claim 3, further comprising interleaving the UCI bits before encoding the UCI bits into symbols to reorder the sequence of the UCI bits.

9. The method of claim 6, further comprising interleaving the combined groups of UCI bits before encoding the UCI bits into symbols to reorder the sequence of the combined groups of UCI bits wherein interleaving comprises reordering to reduce a Hamming distance between the groups of symbols.

10. The method of claim 9, wherein reducing a Hamming distance comprises reducing a Hamming distance between the groups of symbols mapped to different transmission ports.

11. The method of claim 1, further comprising transmitting the groups of symbols on odd and even subcarriers from the two different diversity antennas so that a portion of the odd subcarriers are transmitted on a first of the two diversity antennas and another portion of the odd subcarriers are transmitted on a second of the two diversity antennas.

12. The method of claim 1, wherein the diversity transmission is through a single antenna element providing an effect of two transmit diversity antennas.

13. A non-transitory computer-readable medium having instructions stored thereon to cause a user equipment of a radio communications system to send uplink control information from the user equipment to a serving node of the radio communications system, the user equipment having a transmission port for each of at least two transmit diversity antennas, each antenna transmitting in uplink slots of an uplink subframe, each slot having a plurality of transmission frequency subcarriers, the instructions when operated on by the computer causing the computer to perform operations comprising:
encoding uplink control information bits into symbols;
splitting the encoded symbols into at least four groups of symbols for use to achieve diversity transmission;
phase shifting two of the at least four groups of symbols to provide a frequency shift of one subcarrier;

cyclically repeating each of the at least four groups of symbols to generate a repeated group for each of the at least four groups of symbols; and mapping the repeated groups each to different transmission ports of the user equipment for diversity transmission as uplink control information through a plurality of uplink transmission slots of the uplink subframe.

14. The non-transitory computer-readable medium of claim 13, wherein mapping comprises mapping the phase shifted groups of symbols to one of the odd and even subcarriers and mapping the groups of symbols that are not phase shifted to the other of the odd and even subcarriers.

15. The non-transitory computer-readable medium of claim 13, the operations further comprising:

segmenting a sequence of bits of uplink control information (UCI) to form a plurality of groups of UCI bits, encoding the groups of UCI bits in respective error correcting encoders, one for each group of UCI bits;

interleaving the error corrected groups of UCI bits before encoding the UCI bits into symbols to reorder the sequence of the UCI bits; and providing the encoded groups of UCI bits as UCI bits for encoding into symbols.

16. A radio terminal of a radio communications system operative to send uplink control information from the radio terminal to a serving node of the radio communications system, the radio terminal having a transmission port for each of at least two transmit diversity antennas, each antenna transmitting in uplink slots of an uplink subframe, each slot having a plurality of transmission frequency subcarriers, the radio terminal comprising:

a symbol encoder to encode uplink control information bits into symbols;

a symbol splitter to split the encoded symbols into at least four groups of symbols for use to achieve diversity transmission;

a multiplexer to phase shift two of the four groups of symbols to provide a frequency shift of one subcarrier;

a repeater to cyclically repeat each of the at least four groups of symbols to generate a repeated group for each of the at least four groups of symbols; and a mapper to map the repeated groups each to different transmission ports of the user equipment for diversity transmission as uplink control information through a plurality of uplink transmission slots of the uplink subframe.

17. The radio terminal of claim 16, wherein the mapper maps the phase shifted groups of symbols to one of the odd and even subcarriers and the groups of symbols that are not phase shifted to the other of the odd and even subcarriers.

18. The radio terminal of claim 16, further comprising:

a segmentation unit to segment a sequence of bits of uplink control information (UCI) to form a plurality of groups of UCI bits, and an error correction encoder, one for each group of UCI bits, to encode the groups of UCI bit and to provide the encoded groups of UCI bits as UCI bits to the symbol encoder.

19. The radio terminal of claim 18, wherein the symbol encoder encodes the groups of UCI bits into symbols by applying bits from a first group of UCI bits to one axis of a phase-shift keyed encoder and applying bits from a second group of UCI bits to another axis of a phase-shift keyed encoder and wherein the mapper maps the repeated groups by applying symbols of the phase-shift keyed encoder to different ports for transmission.

20. The radio terminal of claim 19, wherein the segmentation unit segments the sequence of UCI bits into two groups of UCI bits, wherein the phase-shift keyed encoder is a quaternary phase-shift keyed (QPSK) encoder, to encode the groups of UCI bits into symbols by applying bits of both groups to each of two QPSK encoders, and wherein the mapper maps the symbols by applying the output of each QPSK encoder to one of two different ports.

21. The radio terminal of claim 18, further comprising a codeword combiner to combine the groups of UCI bits by alternate concatenation before encoding into symbols.

22. The radio terminal of claim 16, further comprising an interleaver to interleave the uplink control information (UCI) bits before encoding the UCI bits into symbols to reorder the sequence of the UCI bits.

23. The radio terminal of claim 22, wherein reordering comprises reordering to reduce a Hamming distance between the groups of symbols mapped to different transmission port.

24. The radio terminal of claim 16, further comprising a transmitter to transmit the groups of symbols on odd and even subcarriers from the two different diversity antennas so that a portion of the odd subcarriers are transmitted on a first of the two diversity antennas and another portion of the odd subcarriers are transmitted on a second of the two diversity antennas.

25. The radio terminal of claim 16, further comprising a transmitter to transmit the groups of symbols on odd and even subcarriers from a single antenna element providing an effect of two transmit diversity antennas.

* * * * *